Figure 1:
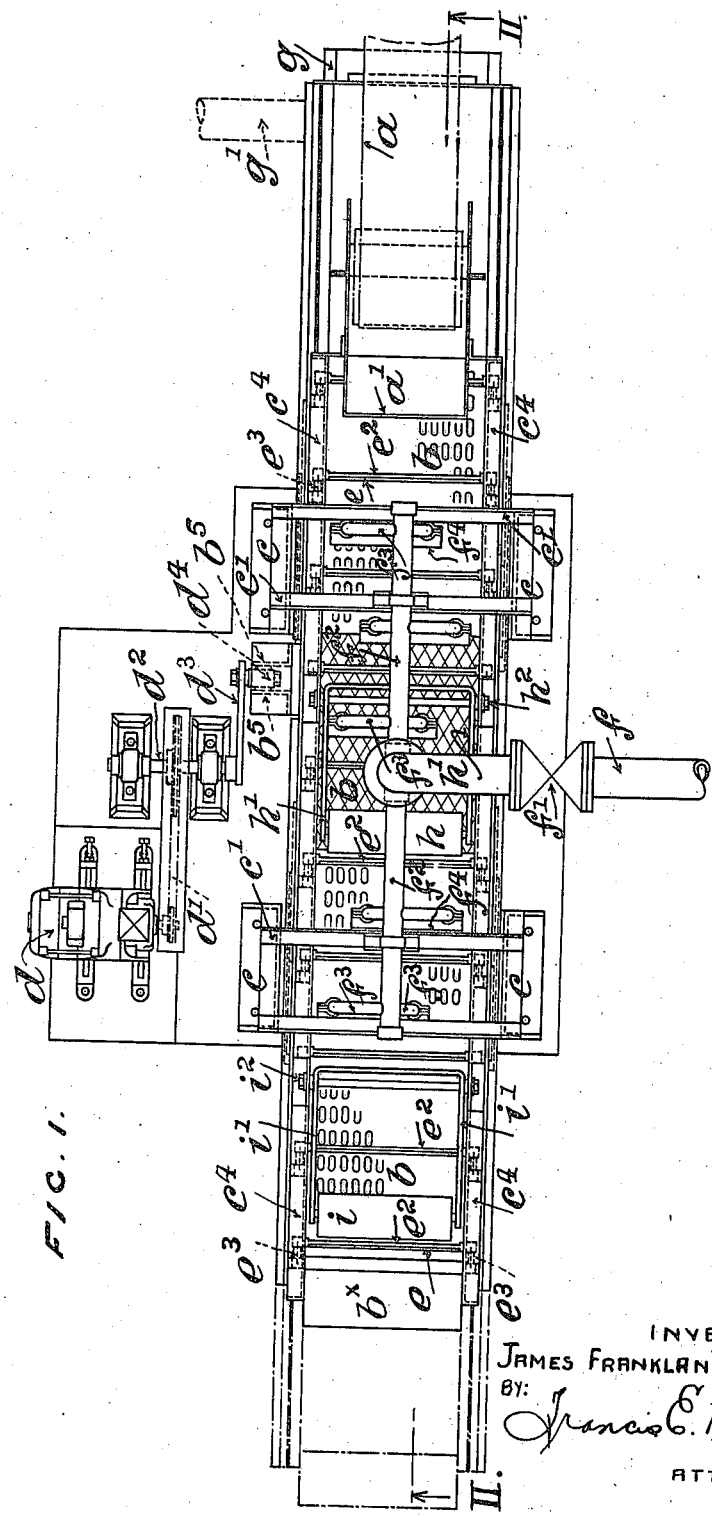

Jan. 12, 1943. J. F. BOLTON 2,308,264
METHOD OF AND MEANS FOR TREATING SEWAGE SCREENINGS WHICH HAVE
ALREADY BEEN REMOVED FROM SEWAGE
Filed Aug. 2, 1940 3 Sheets-Sheet 1

INVENTOR:
JAMES FRANKLAND BOLTON
BY:
Francis E. Boyse
ATTORNEY

INVENTOR:
JAMES FRANKLAND BOLTON

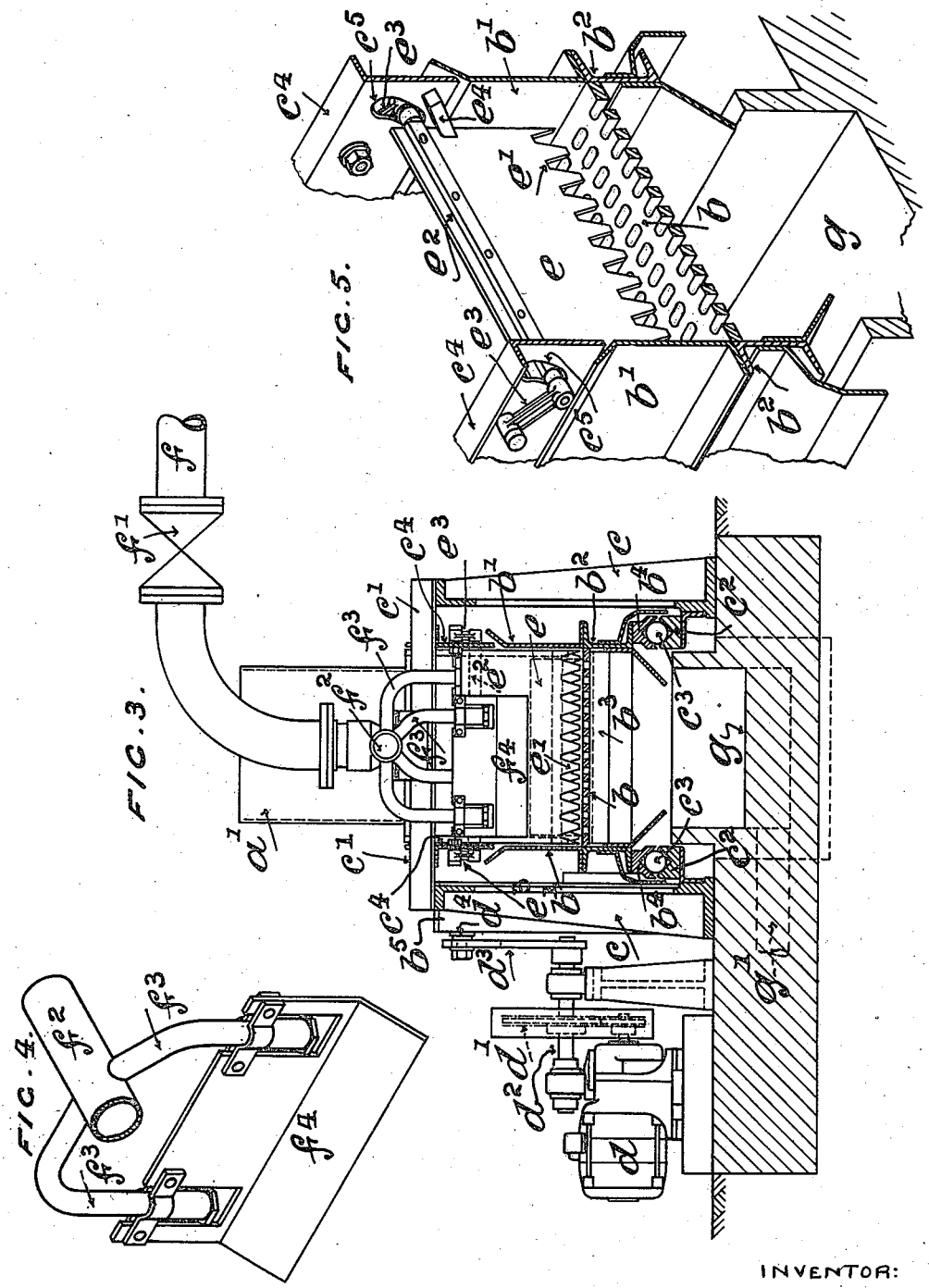

Patented Jan. 12, 1943

2,308,264

UNITED STATES PATENT OFFICE 2,308,264

METHOD OF AND MEANS FOR TREATING SEWAGE SCREENINGS WHICH HAVE ALREADY BEEN REMOVED FROM SEWAGE

James Frankland Bolton, Heywood, England

Application August 2, 1940, Serial No. 349,522
In Great Britain September 21, 1939

4 Claims. (Cl. 210—196)

This invention relates to a method of and means for treating sewage screenings which have already been removed from crude sewage by screening plant.

As is known, the raw sewage arriving at purification plants is passed to a screening apparatus which holds back the larger or coarser material consisting of fecal matter together with rags and other matter. This screened material becomes objectionable if not soon dealt with, and even if the whole of it is broken up sufficiently to be passed on through the subsequent treatments it is liable to cause trouble and to adversely affect the proper purification of the sewage.

According to the present invention the method consists in subjecting the screened or separated material to a washing process whilst supported on a perforated or openwork table or the like, the screened material being acted upon by jets or sprays of water or other liquid whilst it is mechanically scraped or moved over or upon the table or the like, whereby the fecal and like matter is broken up and washed through the table or the like and eventually passed to the usual purification plant for subsequent treatment, whilst the rags and other matter remaining upon the table or the like are separately collected and disposed of as required. By such a method of washing the screened material, the fecal matter is broken up or pulverized by the jets or sprays of water and washed through the openwork table or the like so that it can be led away to the purification plant for further treatment, but the rags and other matter which might give rise to trouble in the subsequent treatments are sorted out and can be disposed of by burning or otherwise. The screened material may be rolled or squashed into a flat form upon the table or the like to enable it to be more effectively acted upon, and the rags, etc. which are left can have some of the moisture squeezed out before they leave the table or the like.

Such a method could be carried out in various ways, the necessary apparatus being a perforated or openwork table or other support with provision for feeding the screened material thereto, mechanical arrangements for moving or scraping the material on the table or the like (as by movable scraper devices or by moving the table or the like relative to certain scraper devices), provision for directing jets or sprays of water onto the material, and arrangements for collecting the matter washed out and leading it away for the subsequent treatments.

Preferably the apparatus includes a perforated table or plate arranged to be reciprocated endwise and to co-operate with a series of pivoted scraper plates or doors which permit the material to move forward in stages along the table or plate, such pivoted plates or doors forming a series of boxes or compartments in some or all of which the jets or sprays act on the material. According to a further feature, a squeezing roller is arranged to squash the screened material into a flat form upon a section of the table or plate, whilst another feature relates to the provision of a second squeezing roller arranged to act on the rags and other matter upon a perforated section of the table or plate near the rear end thereof.

Figure 2:
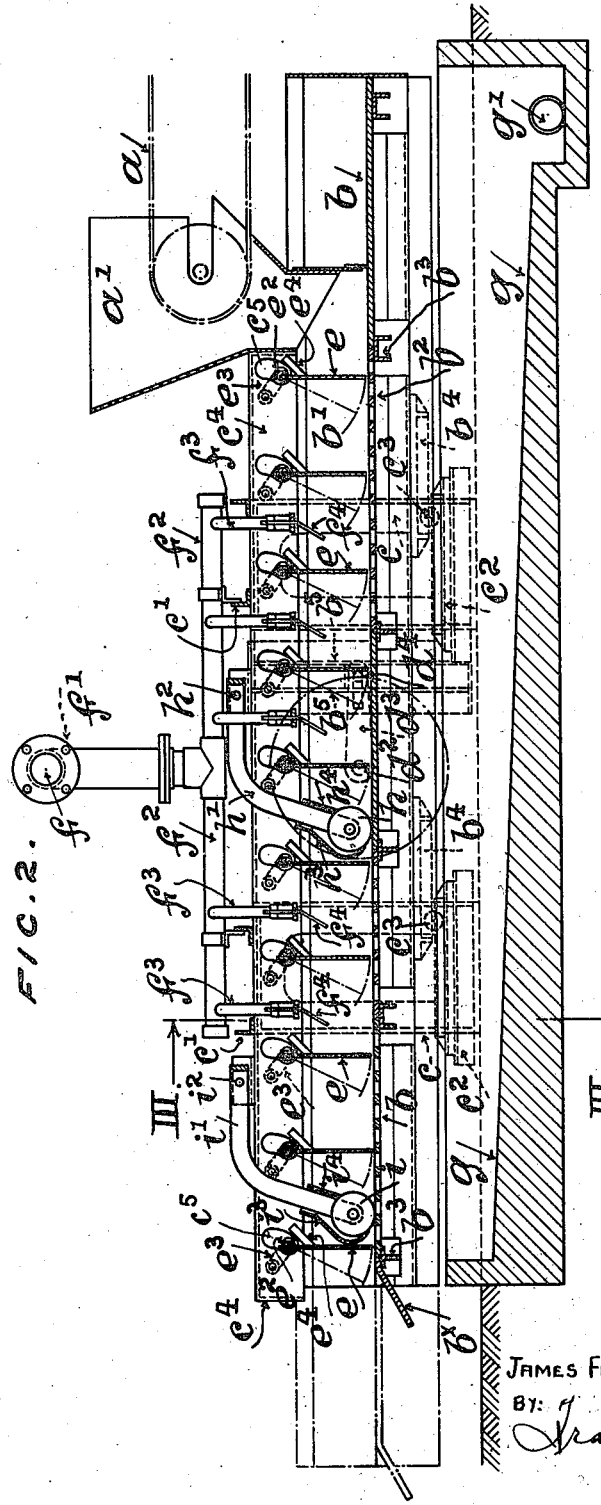

One arrangement of apparatus for carrying out the invention is shown in the accompanying drawings, wherein Fig. 1 is a plan view of the complete apparatus; Fig. 2 is a longitudinal section taken mainly on the line II—II in Fig. 1; Fig. 3 is a transverse section taken mainly on the line III—III in Fig. 2; Fig. 4 is an enlarged detail view of the means for directing water onto the perforated table, including a spreader plate; and Fig. 5 is an enlarged detail view showing one of the pivoted scraper plates and the perforated table and adjacent parts.

Referring to the drawings, there is shown a band conveyor $a$ which delivers the screened material into a hopper $a^1$ from which the material falls onto a long reciprocating table $b$. This table has upright longitudinal side pieces $b^1$ with out-turned upper edges, and is mounted on lower longitudinal members $b^2$ connected by crossmembers $b^3$, the members $b^2$ having fixed on each side two short lengths of guide rail $b^4$ whose under surfaces are of inverted V form. The fixed framework of the apparatus includes two pairs of standards $c$ with upper cross members $c^1$, and these standards have fixed thereto guide rails $c^2$ shaped and arranged to co-operate with the movable guide rails $b^4$ through interposed ball rollers $c^3$, so that the whole table assembly is supported between the standards but is free to move endwise.

The endwise reciprocation is obtained from an electric motor $d$ driving through a chain $d^1$ a crank shaft $d^2$ on which is fixed a crank $d^3$ whose outer end carries a pin on which is freely mounted a die or block $d^4$, this die being arranged to slide vertically up and down between a pair of guides $b^5$ fixed to the longitudinal members $b^2$ of the table, whereby the rotation of the crank causes the table to be reciprocated slowly endwise.

The table $b$ is shown in several sections or lengths, some of which are perforated by having slots or holes formed therein across almost the entire width; but there is a plain section at the front to receive the material as its falls from the hopper, and another near the middle for a purpose to be explained later, whilst a plain inclined delivery plate $b^x$ is shown at the rear end over which the separated rags and other matter are delivered.

The cross members $c^1$ of the standards $c$ have fixed thereto longitudinal supports $c^4$ between which are pivoted at intervals scraper plates $e$ spanning the width of the reciprocating table $b$ and having their lower edges normally just clear of the surface of such table. These scraper plates $e$ have toothed or serrated lower edges with the teeth $e^1$ staggered in successive plates so that the material passing beneath them is well scraped or combed. As shown particularly in Fig. 5, each plate $e$ is mounted on a bar $e^2$ and the ends of these bars pass through segmental slots $c^5$ in the supports $c^4$ and are carried in short arms $e^3$ pivoted upon the supports $c^4$. The arrangement is such that the movement of the table $b$ carries material forward beneath each plate $e$, but the latter is prevented from swinging back beyond the vertical by a stop $e^4$. However, jamming of the plates $e$ on the backward stroke of the table due to a large or hard lump of material getting caught beneath the scraper plate is prevented, since the plates can move bodily upwards on the pivoted arms $e^3$ in case the resistance becomes too great.

The scraper plates $e$ are so spaced as to form a series of boxes or compartments into some of which powerful jets or sprays of water can be directed down onto the surface of the table $b$. For this purpose there is shown a high pressure water supply pipe $f$ delivering through a valve $f^1$ to a distributing pipe $f^2$ supported by the cross members $c^1$, and this pipe $f^2$ has pairs of branches $f^3$ ending in nozzles or outlets disposed over several of the boxes or compartments. These branches are staggered in succeeding boxes or compartments so that the jets or sprays cover the whole width of the table $b$, and this effect is aided by spreader plates $f^4$. One of such spreader plates is attached below each pair of branches, the outlets from which are immediately above the upper edge of the plate, so that the water flows down the back and front of the plate and is spread out laterally (see Fig. 4).

The operation of the apparatus is as follows. As the table is reciprocated end-on it carries the screened material (on the forward stroke) at least beneath the first scraper plate $e$ which swings away to allow this; but on the backward stroke of the table the plate swings back to the vertical position against the stop $e^4$, and so the material is confined in the first box or compartment. On the next forward stroke of the table the material passes in similar manner into the next box or compartment where it is acted upon by the water jets. As the material passes thus in stages along the reciprocating table it is broken up and washed by the jets, so that all fecal matter and the like is washed through the perforations in the table into an inclined collecting channel $g$ whence it passes through a drain pipe $g^1$ for treatment in the purification plant. The rags, etc. left on the table $b$ at the end of the washing treatment fall or are pushed by the last scraper plate $e$ over the inclined delivery plate $b^x$ at the rear end of the table and can be collected for disposal by burning or otherwise as desired.

The action of the reciprocating table and the pivoted scraper plates results in the screened material being frequently scraped and turned over and moved about to facilitate the breaking up and washing out of the fecal matter and the like.

There is shown in one of the jet boxes or compartments a squeezing roller $h$ carried in arms $h^1$ pivoted at $h^2$ to the fixed longitudinal supports $c^4$ and having scrapers $h^3$, $h^4$ to keep the roller clean, such roller bearing by its own weight upon an unperforated section of the table $b$ which may have a chequered or other roughened surface, whereby the material on such section of the table can be squashed or flattened to expose it more fully to the action of the water jets. The section of the table beneath the roller $h$ could, however, be perforated if desired.

A similar roller $i$ having arms $i^1$ pivoted at $i^2$ and scrapers $i^3$, $i^4$ is arranged to work over the perforated rear portion of the table $b$, this serving to squeeze moisture out of the rags, etc. before they leave the table and also to force through the perforations any remaining fecal or like matter which it is desired to convey to the purification plant for subsequent treatment.

I declare that what I claim is:

1. Apparatus for treating sewage screenings, comprising a longitudinally reciprocable perforated table, longitudinal side members carried by said table and forming therewith a trough, means for reciprocating said table, feeding means disposed at one end of the table for delivering screened material to said trough, a series of pivotally mounted scraper plates depending toward said table and having their lower edges normally disposed adjacent the upper surface of the table and extending transversely thereof, said scraper plates being spaced apart longitudinally of the table thereby to form with said side members a series of compartments, means disposed at the end of the table opposite the feeding means for removing and discharging material not scraped through the table, said scraper plates being swingable on their pivots toward said discharging means, stops for limiting movement of the plates toward the feeding means, means for delivering water upon the material in some of said compartments and means below the table for collecting and leading away the water and other matter falling from said table.

2. Apparatus as set forth in claim 1, including pressure rollers disposed in some of said compartments in position to compress the screened material into flat form.

3. Apparatus for treating sewage screenings, comprising a longitudinally reciprocable table perforated over portions of its length separated by an unperforated portion, longitudinal side members carried by said table and forming therewith a trough, means for reciprocating said table, feeding means disposed at one end of the table for delivering screened material to said trough, a series of pivotally mounted scraper plates depending toward said table and having their lower edges normally disposed adjacent the upper surface of the table and extending transversely thereof, said scraper plates being spaced apart longitudinally of the table thereby to form with said side members a series of compartments, the pivotal points of said scraper plates being vertically movable thereby to permit variation of the distance between the edges of the plates and the table, means disposed at the end of the table opposite the feeding means for removing and discharging material not scraped through the table, said scraper plates being swingable on their pivots toward said discharging means, stops for limiting movement of the plates toward the feeding means, means for delivering water upon the material in some of said compartments, pressure rollers disposed one in a compartment over the unperforated portion and another in a compartment over the perforated portion of the table thereby to compress the screened material in said compartments, and means below the table for collecting and leading away the water and other matter falling from said table.

4. Apparatus as set forth in claim 3, said water-delivering means including nozzles having spreader plates, and means carried by said apparatus for cleaning the pressure rollers.

JAMES FRANKLAND BOLTON.